(12) United States Patent
Labbe

(10) Patent No.: US 8,307,706 B2
(45) Date of Patent: Nov. 13, 2012

(54) BOAT STEERING FLUID SIGHT GAUGE

(75) Inventor: Robert A. Labbe, Woodbury, CT (US)

(73) Assignee: Underway Marine LLC, Bristol, CT (US)

( * ) Notice: Subject to any disclaimer, the term of this patent is extended or adjusted under 35 U.S.C. 154(b) by 49 days.

(21) Appl. No.: 12/942,455

(22) Filed: Nov. 9, 2010

(65) Prior Publication Data

US 2011/0283788 A1     Nov. 24, 2011

Related U.S. Application Data

(60) Provisional application No. 61/346,176, filed on May 19, 2010.

(51) Int. Cl.
*G01F 23/02* (2006.01)
(52) U.S. Cl. .......................................................... 73/323
(58) Field of Classification Search .................... 73/323, 73/334; 184/96; 116/227
See application file for complete search history.

(56) References Cited

U.S. PATENT DOCUMENTS

| | | | | |
|---|---|---|---|---|
| 1,043,680 A | * | 11/1912 | Dowell ............................ | 73/323 |
| 2,755,629 A | * | 7/1956 | Baisch ............................. | 60/534 |
| 3,103,816 A | * | 9/1963 | Kawecki .......................... | 73/323 |
| 3,181,362 A | * | 5/1965 | McKenney ...................... | 73/323 |
| 3,211,321 A | * | 10/1965 | Holmes .......................... | 116/227 |
| 3,568,628 A | * | 3/1971 | Erickson ........................ | 116/227 |
| 3,832,901 A | * | 9/1974 | Girvin, III ....................... | 73/325 |
| 5,383,338 A | | 1/1995 | Bowsky et al. | |
| 5,713,241 A | | 2/1998 | Lamb et al. | |
| 5,758,746 A | * | 6/1998 | Sage ............................... | 184/96 |
| 6,658,844 B1 | | 12/2003 | Lammers | |
| 6,913,438 B2 | * | 7/2005 | Rockwood ..................... | 415/112 |
| 7,063,061 B2 | * | 6/2006 | Nagao et al. .............. | 123/195 R |

OTHER PUBLICATIONS

Fruitland Tool & Manufacturing Sightglasses Product Information; http://www.fruitland-mfg.com/sightglasses.html; retrieved Mar. 16, 2010; 1 page.
Lenz Hydraulic Solutions & Manufacturing Product Information; http://www.lenzinc.com/productfamily_list.php?id=TkRFJTNE; retrieved Mar. 16, 2010; 1 page.
Miller Plastic Products Inc.—Sight Glasses Product Information; http://www.millerplastics.com/sight_glasses.html; retrieved Mar. 16, 2010; 1 pages.
Miller Plastic Products Inc.—Sight Glasses Product Image (enlarged); http://www.millerplastics.com/images/sightglasses/1big.jpg; retrieved Mar. 16, 2010; 1 pages.

(Continued)

*Primary Examiner* — John Fitzgerald
(74) *Attorney, Agent, or Firm* — St. Onge Steward Johnston & Reens LLC

(57) ABSTRACT

A marine steering fluid system sight gauge comprises a hollow body having an annular first end, a second end, and a substantially transparent intermediate portion. The annular first end is externally threaded and screws into and sealingly engages against a threaded aperture of a marine steering fluid system. The second end is internally threaded and sealingly receives the threaded cylindrical plug of a marine steering fluid system cap. The hydraulic fluid level is periodically inspected by viewing the level of fluid in the transparent intermediate portion of the sight gauge.

12 Claims, 4 Drawing Sheets

OTHER PUBLICATIONS

Pegasus Glass—Sight Glass Product Information; http://www.pegasus-glass.com/producttype.asp?SuperCat=5; retrieved Mar. 16, 2010; 1 page.

Top Viewing Liquid Indicators for Monitoring of Machine Fluids; Engineered Sensors Tedeco Products; Tedeco Sight Gages: Prismalites; http://www.tedecoindustrial.com/prism.htm; retrieved Mar. 16, 2010; 3 pages.

Sight Gauges to Monitor Liquid Level , Special Sight Devices, Windows, and Flow Indicators; Engineered Sensors Tedeco Products—"See Level" Sight Gages; http://www.tedecoindustrial.com/level.htm; retrieved Mar. 16, 2010; 3 pages.

Sight Gages and Plugs, Liquid Level Indicators, and Special Sight Devices for Machine Fluids; Engineered Sensors Tedeco Products—Sight Gages; http://www.tedecoindustrial.com/sight.htm; retrieved Mar. 16, 2010; 1 page.

Fused Glass Sight Plugs and Polymer Sealed Sight Plugs for Fluid Monitoring; Engineered Sensors Tedeco Products—Tedeco Sight Plugs; http://www.tedecoindustrial.com/plugs/htm; retrieved Mar. 16, 2010; 3 pages.

Hydraulic Reservoir Accessories—Sight Level Gauges by Vescor Corporation Product Information; http://www.vescor.com/hydraulic_acc42.htm; retrieved Mar. 16, 2010; 2 pages.

* cited by examiner

BOAT STEERING FLUID SIGHT GAUGE

The present application claims the benefit under 35 U.S.C. §119(e) of U.S. Provisional Patent Application Ser. No. 61/346,176 filed on May 19, 2010.

FIELD OF THE INVENTION

The present invention relates generally to an apparatus and method for retrofitting marine hydraulic steering systems to enable visual inspection and determination of the presence of a safe level of hydraulic fluid in the hydraulic steering system, and more specifically, relates to a sight gauge kit which can be attached to a steering fluid reservoir to inspect the level of hydraulic fluid.

BACKGROUND OF THE INVENTION

Marine hydraulic steering systems are typically used in both large ships as well as power boats. The hydraulic systems are used to position the rudder to change direction of travel of the craft. However, a frequent problem, particularly with older boats, is the leakage of hydraulic fluid around seals, and losses of fluid through other means. Insufficient hydraulic fluid in the steering system will lead to the loss of steering control, rendering the boat dangerously unnavigable.

In typical power boat marine hydraulic steering systems the only way to detect low levels of hydraulic fluid is to unscrew the cap of the system and visually inspect the level of fluid. This is typically only possible when the boat is at rest, for example at a dock or mooring. It is not possible to continuously monitor hydraulic fluid levels while the boat is underway because opening the cap will cause spillage and loss of the hydraulic fluid. Accordingly, a boater may suddenly reach an insufficient level of hydraulic fluid while underway. This is potentially very dangerous, as the boater may lose control of the boat at when the boat is travelling at a high speed or while it is in a close passage with another boat.

What is desired, therefore, is an apparatus and method that allows a boater to easily retrofit existing power boat marine hydraulic systems to visually inspect and determine of the presence of a safe level of hydraulic fluid in the hydraulic steering system

SUMMARY OF THE INVENTION

The invention is directed to a sight gauge for use in determining if a leak is present in a hydraulic fluid system. The design allows for a user to easily install a sight gauge into the inlet port of a hydraulic fluid system to determine if the hydraulic fluid level is low, or if a leak is present in the hydraulic fluid system.

It is an object of the present invention is to provide a sight gauge which does not require a hydraulic fluid system to be modified in order to use the gauge.

These and other objects of the present invention are achieved by provision of a sight gauge system having an annular first end, an annular second end, and an intermediate portion extending between the first end and the second end. The body is cylindrical in shape and is composed of a substantially transparent plastic material; where the body is less than 3 inches in height and has a wall with a minimum thickness of ⅛ inch. A reservoir inside the body extends from the first end through the body to the second end. The first end has outer threads formed on the outer surface of the annular first end; the first end having an opening connecting with the reservoir and having a smaller diameter than the intermediate portion and the second end. An O-ring seal is fitted on to the annular first end. The second end has inner threads formed on the inner surface of the annular second end and a second opening in the second end connecting with the reservoir; the second opening being larger than the first opening. A screw cap having a threaded cylindrical plug, and a star-shaped knob containing finger grippable protrusions. The threaded cylindrical plug is sized to be threaded into the annular second end. An O-ring seal is fitted into the annular second end. In some embodiments the transparent body is printed with a level indicator. In some of these embodiments the transparent body is covered with a transparent adhesive with a printed level indicator.

In accordance with another embodiment of the present invention there is a method of determining the presence of a leak in a hydraulic fluid system. The method comprises the steps of removing a cap from an opening in the hydraulic fluid reservoir; inserting the sight gauge into the opening of the hydraulic fluid reservoir; removing the cap from the sight gauge. Pouring liquid into the sight gauge; replacing the cap on the sight gauge; and continuously checking the fluid level of the sight gauge to determine if the fluid level in the sight gauge has dropped.

The invention and its particular features and advantage will become more apparent from the following detailed description considered with reference to the accompanying drawings.

BRIEF DESCRIPTION OF THE DRAWINGS

FIG. 3 is cross-sectional view of the line 3-3 of the sight gauge of FIG. 1 a.

DETAILED DESCRIPTION OF THE INVENTION

The system and method of detecting a safe level of hydraulic fluid generally includes a portable sight gauge.

Figure 1:
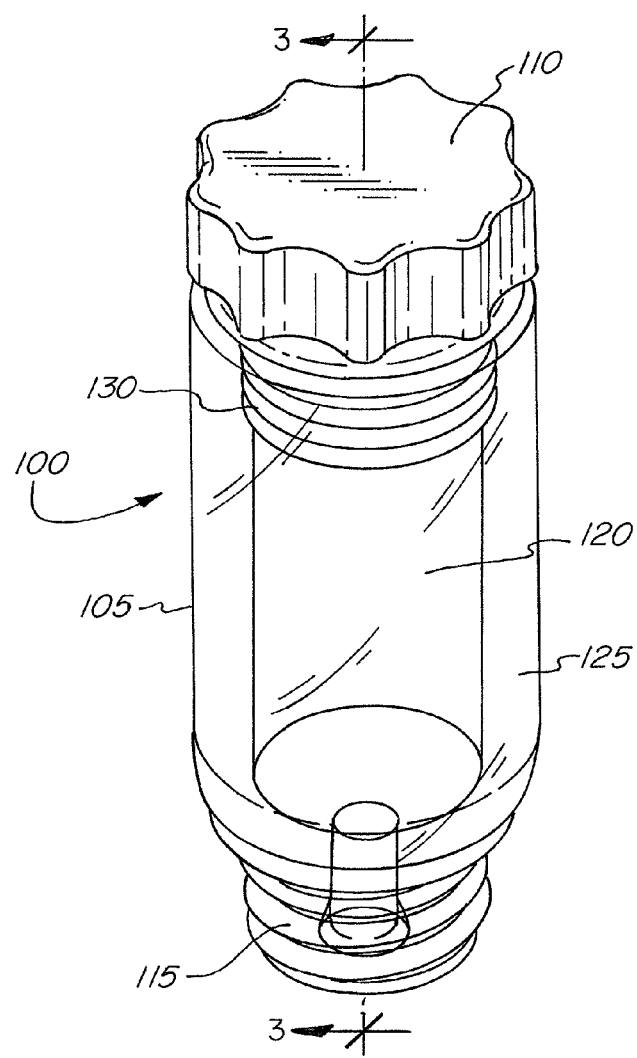
FIG. 1 is a top and front perspective view of a sight gauge according to the present invention.
Figure 2:
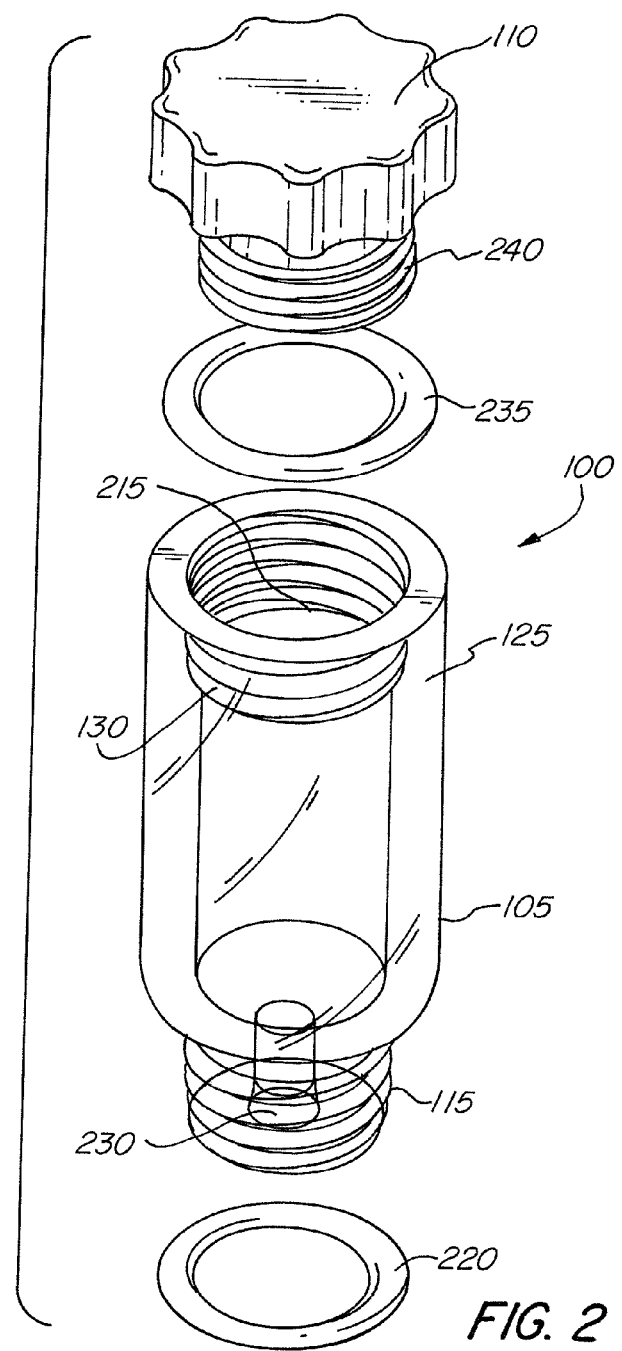
FIG. 2 is an exploded top and front perspective view of the sight gauge of FIG. 1.

As best seen in FIGS. 1 and 2, the sight gauge 100 may contain a body 105 and a screw-on cap 110. The body is preferably made from a transparent or substantially transparent material such that the user can see a level of fluid inside of the body. The body may be made from glass, plastic, or any other known material for producing a transparent or substantially transparent device. The body may be colorless, or the body may be made from a colored material to add aesthetics and contrast to the sight gauge.

Figure 3:
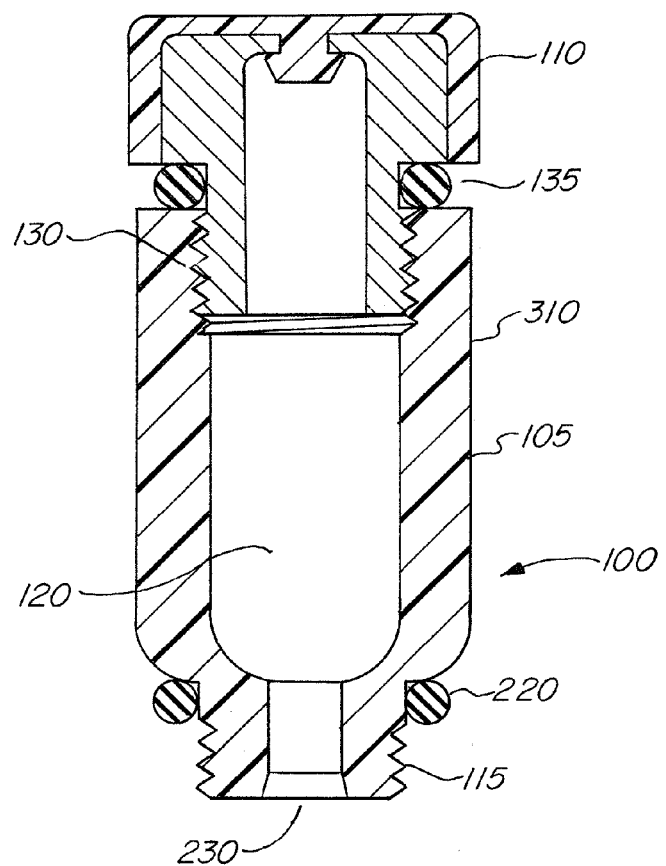

Body 105 has an internal reservoir 120 that runs the length of, or substantially the length of the entire body. Internal reservoir 120 is designed to hold any liquid poured into the sight gauge 100. Internal reservoir 120 may be of a predetermined volume such that the user of sight gauge 100 is aware of approximately how much hydraulic fluid can be held inside of internal reservoir 120. Internal reservoir 120 can be of differing volume levels depending of the specific application of the sight gauge 100. Internal reservoir 120 has two defined openings, as best seen in FIGS. 2 and 3. Body 105 has an upper fluid inlet port 215 which contains inner threading 130 inside of the inlet port and on the inner surface of the reservoir 120. Cap 110 has cap threads 240 defined to be screwed into upper threads 130. Cap threads 240 may further have a seal, which is an O-Ring or gasket 235 placed over cap threads 240 to provide a better seal between cap 110 and body 105. It should be noted that while cap 110 and body 105 define threading to attach cap 110 to body 105, cap 110 and body 105 may be attached by any known method including an interference fit.

Body 105 has a lower fluid outlet port 230 and lower threading 115. Lower threading 115 is defined on the outer surface of body 105. Lower fluid outlet port 230 is preferably smaller than upper fluid inlet port 215 to allow for the liquid poured into the body to accumulate in internal reservoir 120. However, it should be noted, that lower fluid outlet port 230 may be of any size including being equal to or greater in size than upper fluid inlet port 215. Lower threads 115 are sized to be screwed into any reservoir of standard size. However, body 105 need not contain lower threads 115 and may use an interference fit, or any other type of known connection, to be inserted into a hydraulic fluid reservoir. Lower threads 115 further contains a second lower seal, such as an O-ring or gasket 220 to provide a greater seal between sight gauge 100 and the reservoir sight gauge 100 is attached to.

Cap 110 is preferably sized such that the diameter of cap 110 is similar to the diameter of body 105 to provide a sleek look, and to limit the bulk and size of sight gauge 100. However, cap 110 may be of any size including a diameter smaller or larger than the diameter of body 105. Cap 110 is further shaped with finger-grippable protrusions to aid in the placement and removal of cap 110 from body 105. In a preferred embodiment, cap 110 is star-shaped with 9 protrusions; however, cap 110 may be of any shape including any number of finger protrusions.

Body 105 may contain printing or writing on the exterior surface of the body. The printing may be equally spaced lines to provide a level indicator for the user of the sight gauge 100. A logo may also be printed on the body for advertisement purposes. Body 105 may also have a transparent adhesive tape (not shown) overlaid on body 105. The adhesive tape may be transparent or substantially transparent and be of any color including colorless. The transparent adhesive may also be printed with a level indicator or a logo.

As best seen in FIG. 2, an exploded view of sight gauge 100 is shown. To construct the sight gauge, the user places upper gasket 130 over cap threads 240. The user then screws cap 110 into body 105. Finally, the user places lower gasket 220 over lower threads 115.

As best seen in FIG. 3, a sliced view of sight gauge 100 is shown. Sight gauge 100 defines a thickness 310 between the outer surface and the inner surface of body 105. Thickness 310 is preferably 1/8 inch thick, however, thickness 310 can be of any size greater than about 1/16 inch in thickness. The body 105 of sight gauge 100 is preferably about 1 inch" in height, however, sight gauge may have a total height of up to about 3 inches.

Figure 4:
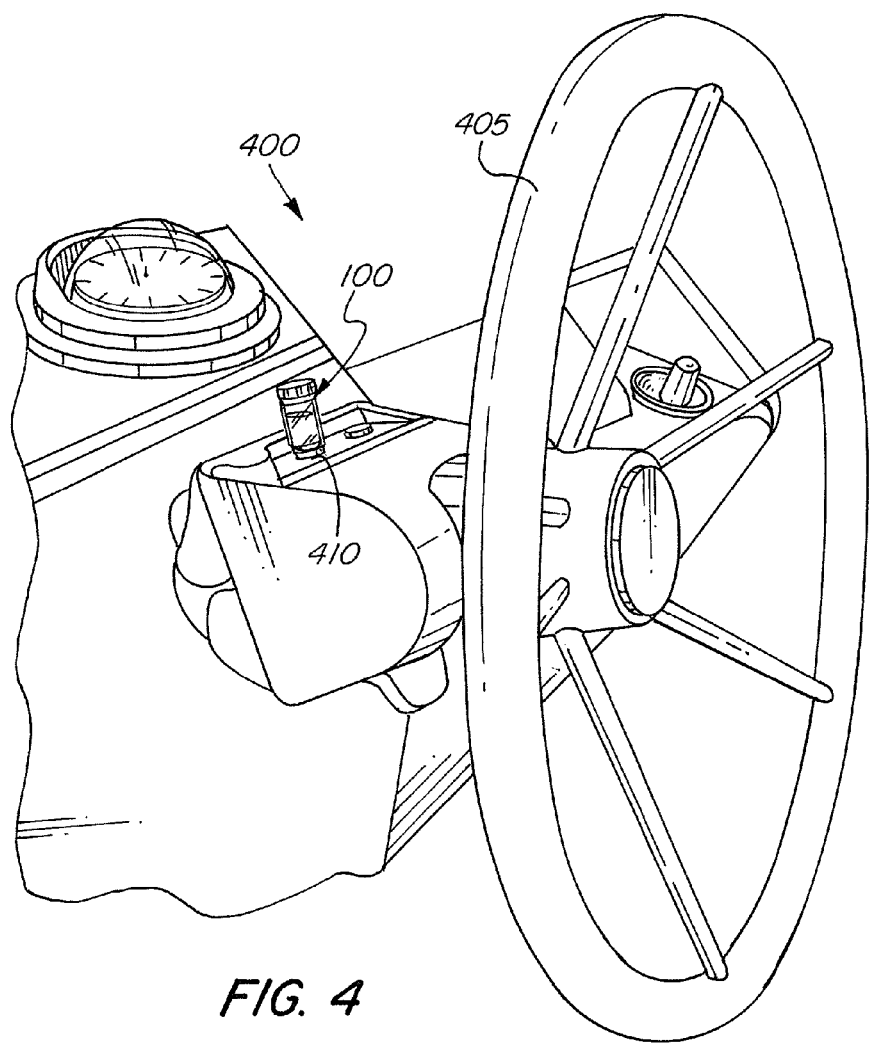
FIG. 4 is a perspective view of the sight gauge of FIG. 1 installed for use in a marine hydraulic steering fluid system of a power boat.

As best seen in FIG. 4, sight gauge 100 is attached to the hydraulic steering fluid reservoir 410 of boat 400. The hydraulic steering fluid is used to control the steering of boat 400 through steering wheel 405. The driver of the boat (not shown) sits or stands behind wheel 405, with easy access to sight gauge 100. In the figure shown, the hydraulic steering fluid reservoir is located behind wheel 405 of boat 400; however, the fluid reservoir may be in any location as designed by the boat designers. Sight gauge 100 is designed to be used to use in any hydraulic fluid reservoir, and be used at any angle designed by the boat designer.

The method of use of the sight gauge of the invention is as follows. The user removes the hydraulic fluid cap of the hydraulic fluid system they intend to check the level of. The user removes the cap 110, and screws the sight gauge 100 into the hydraulic fluid inlet port, making sure a tight seal is created. The user adds hydraulic fluid through the upper fluid inlet port 215 as needed until the sight gauge is full or substantially full, and does not quickly drain into the hydraulic fluid system. The user then screws the screw cap back onto the sight gauge. If any leak is present in the hydraulic fluid system, the level of fluid in the sight gauge 100 will decrease slowly or rapidly depending on the size of the leak. The user is free to remove cap 110 and add more hydraulic fluid to determine the extent of the leak. It should be noted, that the steps in the above method may be changed, for example, the user may attach sight gauge 100 to the hydraulic fluid reservoir before removing cap 110 from sight gauge 100.

This system and method has the advantage in that the existing hydraulic system does not need to be modified to determine if a leak exits. The user can temporarily install the sight gauge into a hydraulic fluid inlet port, add hydraulic fluid, and determine if a leak exists by checking if the level of fluid in the sight gauge decreases. The process is simple to use, and inexpensive to produce. Furthermore, the amount of time needed to determine if a leak exists is greatly reduced as the portable sight gauge can quickly determine if a leak exists.

It would be appreciated by those skilled in the art that various changes and modifications can be made to the illustrated embodiment without departing from the spirit of the present invention. All such modifications and changes are intended to be covered hereby.

What is claimed is:

1. A combination of a marine steering fluid system sight gauge and a marine hydraulic steering fluid system, comprising:

a marine hydraulic steering fluid system;

a hollow body having an annular first end, a second end, and a substantially transparent intermediate portion extending between said first end and said second end;

said intermediate portion having walls having a thickness of 1/16 inch or more;

a reservoir located inside said hollow body extending from said first end to said second end, said reservoir having a generally uniform diameter along a majority of a length of the reservoir;

said annular first end having external threads formed on an outer surface of said annular first end, said annular first end having an opening connecting with said reservoir, said annular first end having a diameter which is less than a maximum diameter of said intermediate portion, said annular first end external threads being sized and adapted to be fitted into and engaged with a threaded aperture of the marine steering fluid system;

sealing means provided on said annular first end for sealing said hollow body against the threaded aperture of the marine steering fluid system;

said second end having internal threads formed on an inner surface of said annular second end and a second opening in said second end connecting with said reservoir, said second opening being larger than said first opening;

a marine steering fluid system cap which includes a threaded cylindrical plug, second sealing means provided on said threaded cylindrical plug for sealing said cap against the annular second end, and a finger-grippable knob, second end internal threads being adapted and sized to engage the threaded cylindrical plug of the marine steering fluid system cap.

2. The combination of claim 1, wherein said sealing means comprises an O-ring fitted on to said annular first end.

3. The combination of claim 2, wherein said intermediate portion is a hollow cylinder.

4. The combination of claim 3, wherein said intermediate portion is formed of transparent plastic.

5. The combination of claim 4, wherein said intermediate portion is has a level indicator marking provided thereon.

6. A method of enabling visual inspection and determination of the presence of a safe level of hydraulic fluid in a marine hydraulic steering fluid system comprising the steps of:

unscrewing a marine hydraulic steering fluid system cap which includes a threaded cylindrical plug, a seal provided on said threaded cylindrical plug, and a finger-grippable knob, from a threaded aperture of a marine hydraulic steering fluid system by gripping the finger-grippable knob and turning the marine hydraulic steering fluid system cap;

attaching a marine steering fluid system sight gauge having a hollow body with an annular first end, a second end, and a substantially transparent intermediate portion extending between said first end and said second end, said intermediate portion having walls having a thickness of 1/16 inch or more; and a reservoir located inside said body extending from said first end to said second end, said reservoir having a generally uniform diameter along a majority of a length of the reservoir; said annular first end having external threads formed on an outer surface of said annular first end, said annular first end having an opening connecting with said reservoir, said annular first end having a diameter which is less than a maximum diameter of said intermediate portion, said annular first end external threads being sized and adapted to be fitted into and engaged with the threaded aperture of the marine steering fluid system; and having sealing means provided on said annular first end for sealing said hollow body against the threaded aperture of the marine steering fluid system; said second end having internal threads formed on an inner surface of said annular second end and a second opening in said second end connecting with said reservoir, said second opening being larger than said first opening, and said second end internal threads being adapted and sized to engage the threaded cylindrical plug of the marine steering fluid system cap;

screwing the threaded cylindrical plug of the marine hydraulic steering fluid system cap into the second opening of the second end of the sight gauge until the sealing means provided on said threaded cylindrical plug seals said marine steering hydraulic fluid system cap against the second end of the sight gauge by gripping the finger-grippable knob and turning the marine hydraulic steering fluid system cap.

7. The method of claim 6, further comprising periodically inspecting a hydraulic fluid level in the transparent intermediate portion of the sight gauge.

8. The method of claim 7, further comprising pouring hydraulic fluid into the sight gauge until a level of hydraulic fluid is visible in the transparent intermediate portion of the sight gauge prior to screwing the threaded cylindrical plug of the marine hydraulic steering fluid system cap into the second opening of the second end of the sight gauge.

9. The method of claim 8, wherein said sealing means comprises an O-ring fitted on to said annular first end.

10. The method of claim 8, wherein said intermediate portion is a hollow cylinder.

11. The method of claim 8, wherein said intermediate portion is formed of transparent plastic.

12. The method of claim 8, wherein said intermediate portion is has a level indicator marking provided thereon.

* * * * *